US012614856B2

(12) United States Patent
Varel et al.

(10) Patent No.: US 12,614,856 B2
(45) Date of Patent: *Apr. 28, 2026

(54) ELECTRICAL ADDRESSING FOR A METAMATERIAL RADIO-FREQUENCY (RF) ANTENNA

(71) Applicant: Kymeta Corporation, Redmond, WA (US)

(72) Inventors: Cagdas Varel, Seattle, WA (US); Steven Howard Linn, Hillsboro, OR (US)

(73) Assignee: Kymeta Corporation, Redmond, WA (US)

( * ) Notice: Subject to any disclaimer, the term of this patent is extended or adjusted under 35 U.S.C. 154(b) by 357 days.

This patent is subject to a terminal disclaimer.

(21) Appl. No.: 18/212,138

(22) Filed: Jun. 20, 2023

(65) Prior Publication Data

US 2023/0335911 A1 Oct. 19, 2023

Related U.S. Application Data

(62) Division of application No. 17/203,526, filed on Mar. 16, 2021, now Pat. No. 11,757,197.

(Continued)

(51) Int. Cl.
*H01Q 15/00* (2006.01)
*H01Q 21/00* (2006.01)

(Continued)

(52) U.S. Cl.
CPC ..... *H01Q 15/0086* (2013.01); *H01Q 21/0056* (2013.01); *H01Q 21/061* (2013.01); *H01Q 21/08* (2013.01)

(58) Field of Classification Search
CPC ........... H01Q 15/0086; H01Q 21/0056; H01Q 21/061; H01Q 21/08
See application file for complete search history.

(56) References Cited

U.S. PATENT DOCUMENTS

| | | | |
|---|---|---|---|
| 6,492,943 | B1 | 12/2002 | Marumoto et al. |
| 6,559,798 | B1 | 5/2003 | Marumoto et al. |

(Continued)

FOREIGN PATENT DOCUMENTS

| | | | |
|---|---|---|---|
| CN | 107209214 | A | 9/2017 |
| CN | 107636896 | A | 1/2018 |

(Continued)

OTHER PUBLICATIONS

Decision of Refusal a Patent received for Japanese Patent Application No. 2022-556653, mailed on Mar. 11, 2025, 2 pages (1 page of English Translation and 1 page of Original Document).

(Continued)

*Primary Examiner* — Dimary S Lopez Cruz
*Assistant Examiner* — Amal Patel
(74) *Attorney, Agent, or Firm* — Womble Bond Dickinson (US) LLP

(57) ABSTRACT

A method and apparatus for electrical addressing for an antenna (e.g., a metamaterial radio-frequency (RF) antenna are described. In one embodiment antenna comprising: a plurality of radio-frequency (RF) radiating antenna elements located in a plurality of rings; and matrix drive circuitry coupled to the plurality of RF radiating antenna elements to drive the antenna elements, wherein the matrix drive circuitry to uniquely address each of the antenna elements using a matrix of a plurality of rows and a plurality of columns with a non-grid-based addressing structure.

10 Claims, 16 Drawing Sheets

Related U.S. Application Data

(60) Provisional application No. 62/991,229, filed on Mar. 18, 2020.

(51) Int. Cl.
*H01Q 21/06* (2006.01)
*H01Q 21/08* (2006.01)

(56) References Cited

U.S. PATENT DOCUMENTS

| | | | | |
|---|---|---|---|---|
| 11,462,644 | B2 | 10/2022 | Otsubo et al. | |
| 2002/0039083 | A1 | 4/2002 | Taylor et al. | |
| 2012/0194399 | A1 | 8/2012 | Bily et al. | |
| 2015/0109178 | A1 | 4/2015 | Hyde et al. | |
| 2016/0174280 | A1 | 6/2016 | Singh et al. | |
| 2016/0218425 | A1 | 7/2016 | Mohamadi | |
| 2016/0218429 | A1 | 7/2016 | Klemes | |
| 2016/0233588 | A1 | 8/2016 | Bily et al. | |
| 2016/0261042 | A1* | 9/2016 | Sazegar | H01Q 21/064 |
| 2018/0108987 | A1 | 4/2018 | Sazegar et al. | |
| 2018/0115063 | A1 | 4/2018 | Sazegar et al. | |
| 2019/0140363 | A1 | 5/2019 | Otsubo et al. | |
| 2020/0168746 | A1* | 5/2020 | Otsubo | H10D 30/6733 |

FOREIGN PATENT DOCUMENTS

| | | | | |
|---|---|---|---|---|
| CN | 110034381 A | 7/2019 | | |
| JP | 09-009322 A | 1/1997 | | |
| JP | 2018-507653 A | 3/2018 | | |
| JP | 2019-087852 A | 6/2019 | | |
| KR | 10-2017-0117196 A | 10/2017 | | |
| TW | 201921801 A | 6/2019 | | |
| WO | 2015/126578 A1 | 8/2015 | | |
| WO | WO-2019031395 A1 * | 2/2019 | | H10D 86/441 |

OTHER PUBLICATIONS

Notice of Allowance received for Taiwanese Patent Application No. 110109773, mailed on Apr. 8, 2025, 8 pages (4 pages of English Translation and 4 pages of Original Document).
Notice of Final Rejection received for Korean Patent Application No. 10-2022-7034784, mailed on Jan. 22, 2025, 2 pages (1 page of English Translation and 1 page of Original Document).
CN Office Action, including Search Report received for Chinese Patent Application No. 202180032548.2, mailed on Nov. 14, 2024, 18 pages (9 pages of English Translation and 9 pages of Original Document).
Request for the Submission of an Opinion received for Korean Patent Application No. 10-2022-7034784, mailed on Nov. 13, 2024, 8 pages (4 pages of English Translation and 4 pages of Original Document).
Zhang et al., "Application to vehicle-mounted mines 45° linear polarization of the sensor Grid Array Antenna", A Journal of Shanxi University Natural Science, vol. 34, No. 2, May 31, 2011, pp. 241-245 (English Abstract Submitted at the Last Page).
International Preliminary Report on Patentability received for PCT Patent Application No. PCT/US21/22984, mailed on Sep. 29, 2022, 6 pages.
International Search Report and Written Opinion received for PCT Patent Application No. PCT/US21/22984, mailed on Jul. 12, 2021, 9 pages.
Notice of Reasons for Refusal received for Japanese Patent Application No. 2022-556653, mailed on Sep. 13, 2024, 8 pages (4 pages of English Translation and 4 pages of Original Document).
Office Action received for Taiwanese Patent Application No. 110109773, mailed on Jul. 22, 2024, 9 pages (4 pages of English Translation and 5 pages of Original Document).
Supplementary European Search Report and Search Opinion received for European Application No. 21771695.0, mailed on Mar. 26, 2024, 10 pages.
Communication Pursuant to Article 94(3) received in related European application No. 21771695.0, mailed Mar. 20, 2026, 6 pages.

* cited by examiner

ELECTRICAL ADDRESSING FOR A METAMATERIAL RADIO-FREQUENCY (RF) ANTENNA

PRIORITY

This application is a divisional of U.S. patent application Ser. No. 17/203,526, titled "Electrical Addressing for a Metamaterial Radio-Frequency (RF) Antenna" and filed Mar. 16, 2021, which claims the benefit of priority from U.S. Provisional Application No. 62/991,229, titled "Electrical Addressing for a Metamaterial RF Antenna" and filed Mar. 18, 2020, each of which is hereby incorporated by reference.

FIELD OF THE INVENTION

Embodiments of the present invention are related to wireless communication; more particularly, embodiments of the present invention are related to electrical addressing for antennas (e.g., metamaterial radio-frequency antennas).

BACKGROUND

Active matrix technologies have been used to drive liquid crystal (LC) displays for many years. In such technologies, one transistor is coupled to each liquid crystal cell and each liquid crystal cell can be selected by applying a voltage to a select signal coupled to the gate of the transistor. Many different types of transistors are used, including thin-film transistors (TFT). In the case of TFT, the active matrix is referred to as a TFT active matrix.

The active matrix uses addresses and drive circuitry to control each of the liquid crystal cells in the array. To ensure each of the liquid crystal cells are uniquely addressed, the matrix uses rows and columns of conductors to create connections for the selection transistors.

The use of matrix drive circuitry has been proposed for use with antennas. However, using rows and columns of conductors may be useful in antenna arrays that have antenna elements that are arranged in a grid of rows and columns but may not be feasible when the antenna elements are not arranged in that manner.

Also, in some implementations, too many rows and columns are required to drive the antenna elements in a grid-based matrix. Addressing is performed inefficiently in such systems. For example, the rows and columns in the grid-based addressing have a varying number of antenna elements in each row and column. In some cases, there are rows and columns with only one element per row/column and up to hundreds of elements per row/column in the same matrix. Thus, it is desirable to have a more efficient matrix driving scheme for such antennas.

SUMMARY

A method and apparatus for electrical addressing for an antenna (e.g., a metamaterial radio-frequency (RF) antenna are described. In one embodiment antenna comprising: a plurality of radio-frequency (RF) radiating antenna elements located in a plurality of rings; and matrix drive circuitry coupled to the plurality of RF radiating antenna elements to drive the antenna elements, wherein the matrix drive circuitry to uniquely address each of the antenna elements using a matrix of a plurality of rows and a plurality of columns with a non-grid-based addressing structure.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the invention include a method and apparatus for decreasing the number of rows and columns in an active matrix of matrix drive circuitry used for driving antenna elements of a metamaterial radio-frequency (RF) antenna. In one embodiment, the antenna is part of a satellite terminal. In one embodiment, the active matrix is an active thin film transistor (TFT) matrix. However, the techniques described herein are not limited to driving TFT-based drivers. In one embodiment, the antenna elements are RF radiating antenna elements (e.g., metamaterial surface scattering antenna elements, varactor diode-based antenna elements, MEMs-based antenna elements, etc.). Non-limiting examples of such antennas and antenna elements are described in more detail below. However, the techniques disclosed herein are not limited to such antennas.

In one embodiment, the reduction in row and column numbers in the active matrix is achieved by using a non-grid-based row and column addressing structure. RF metamaterial antennas with multiple bands and/or operating at high frequencies, such as, for example, Ka frequency, require many RF radiating antenna elements for their operation. In one embodiment, the use of a non-grid-based addressing scheme overcome limitations of grid-based address schemes by redistributing antenna elements uniformly in each row and column to reduce the row and column numbers.

In one embodiment, in the case of an active TFT matrix, the matrix drive circuitry uses a non-grid-based addressing scheme in the TFT matrix to reduce row and column numbers, where each row has the same number of RF radiating antenna elements and each column has the same number of RF radiating antenna elements.

Figure 1:
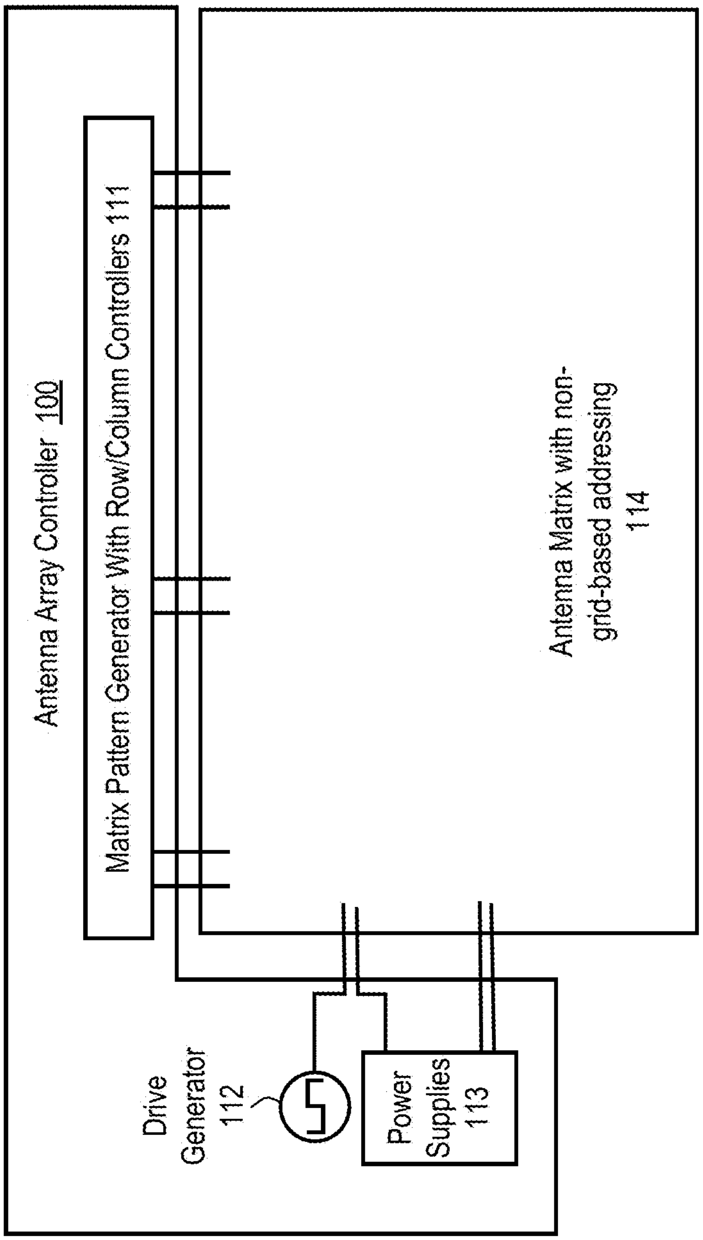
FIG. 1 illustrates an antenna controller that uses active matrix drive circuitry to drive an antenna array.

FIG. 1 illustrates an antenna controller that uses active matrix drive circuitry to drive an antenna array. Referring to FIG. 1, in one embodiment, the antenna elements are arranged in rings in the antenna array in a radial aperture and drivers for the antenna elements are located in rows and columns. Note that while the rows and columns are shown perpendicular to each other, in one embodiment, a grid representation of the matrix configuration is not actually used in the antenna array and is merely a logical layout for purposes of illustrating direct drive control of a matrix configuration as is described in more detail below.

In one embodiment, antenna array controller 100 includes matrix drive circuitry. In one embodiment, the matrix drive circuity uniquely addresses each of the antenna elements using a matrix that includes multiple rows and multiple columns and addresses the antenna elements using a non-grid-based addressing structure. Matrix pattern generator 111 includes row and column controllers to control columns and rows of the antenna matrix 114, which in turn control the operation of drivers in antenna matrix 114 using non-grid-based addressing.

In one embodiment, antenna matrix 114 includes the routing of source and gate lines of drivers of the antenna elements in the antenna array and the rows and columns are used and coupled to control the source and gate lines of those drivers. Thus, the rows and columns are coupled to the antenna elements.

In one embodiment, at least a majority of the rows (e.g., over 80 percent of the rows but less than all the rows, over 90 percent of the rows but less than all the rows, over 95 percent of the columns but less than all the rows, etc.) are coupled to the same number of antenna elements in the array. Also, in one embodiment, at least a majority of the columns (e.g., over 80 percent of the columns but less than all the columns, over 90 percent of the columns but less than all the columns, over 95 percent of the columns but less than all the columns, etc.) are coupled to the same number of antenna elements in the array of antenna elements. Note that the number of elements that are coupled to the rows in the majority is not equal to the number of elements that are coupled to columns in the majority of the columns. In one embodiment, all of the rows are coupled to the same number of antenna elements and all of the columns are coupled to the same number of elements. Again, in one embodiment, the number of elements coupled to the rows is not equal to the number of antenna elements coupled to the columns. In one embodiment, all of rows except for a few are coupled to the same number of elements and all of the columns except for a few are coupled to the same number of elements.

In one embodiment, the number of rows is equal to the numbers of rings of antenna elements that are in the antenna aperture and the number of columns is equal to the of antenna elements in the inner most ring of antenna elements plus 2*(the number of rings minus one). In one embodiment, for N rings of RF radiating antenna elements, the non-grid-based addressing uses N rows and 2N+3 columns. This is in contrast to grid-based address which needs 2N+1 rows and 2N+1 columns. In one embodiment, each row in the matrix is longer than each of the columns in the matrix.

Drive generator 112 generates the drive voltage that is coupled to each of the drive inputs of the drivers for the antenna elements in the array. In one embodiment, the drive voltage swings between +/−5 volts. However, in other embodiments, other voltage values may be used to drive the LC-based antenna elements. In another embodiment, the voltage is +/−10V. In one embodiment, the drive voltage is selected based on the chemistry of the LC to get the desired RF performance. In one embodiment, the drive input of all drivers is common and is at the desired LC ON voltage and frequency. In one embodiment, for a MEMS cell, the drive voltage can be a DC voltage of +15V (for example).

In one embodiment, power supplies 113 provide the voltages to power the logic of drivers in the antenna matrix.

Figure 2:
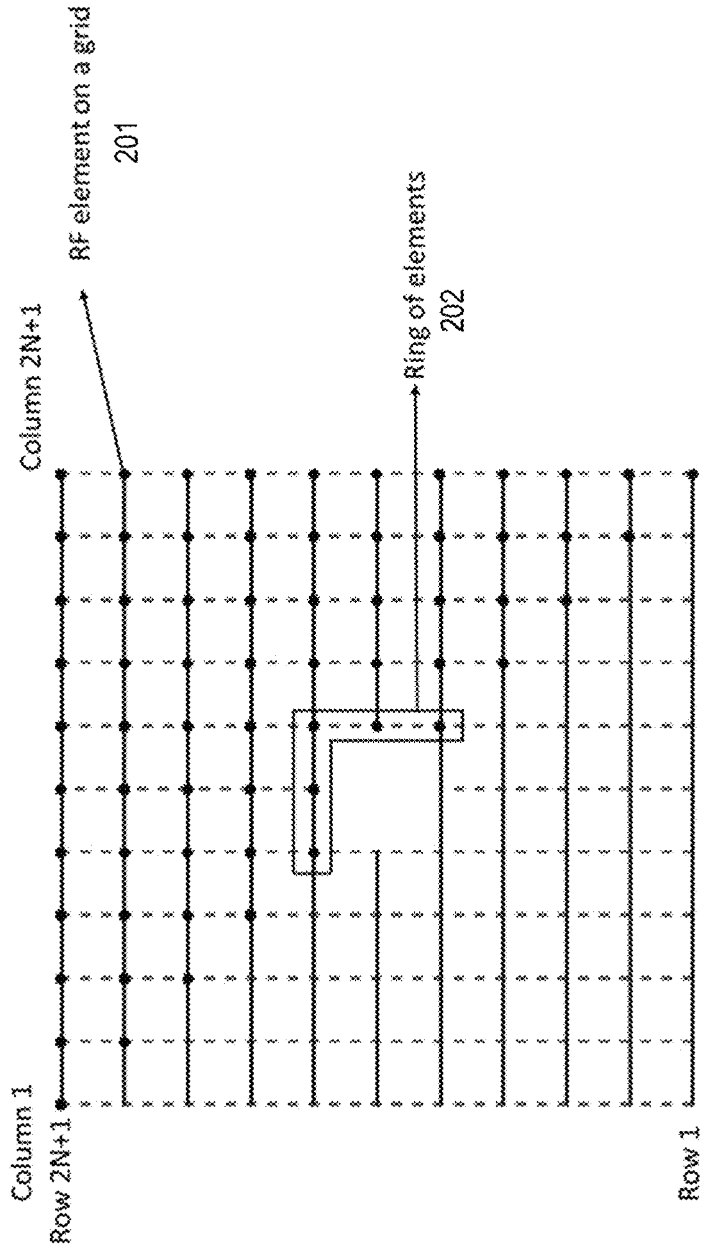
FIG. 2 illustrates elements on grid-based addressing.

To contrast the non-grid-based addressing described herein, FIG. 2 illustrates the elements of a grid-based addressing scheme. Referring to FIG. 2, rows are numbered 1 through 2N+1 and columns are numbered 1 through column 2N+1 and together form a grid. Each of the dots illustrated in FIG. 2 is an RF radiating antenna element that appear at row and column junction in the grid. For example, RF element 201 is shown on the grid as a dot on row 2N and column 2N+1.

In one embodiment, the RF radiating antenna elements in the array are located in rings. Examples of such rings are described in more detail below. In FIG. 2, an example of a ring 202 of five antenna elements is shown with the RF antenna elements appearing as dots on the grid at row and column junctions.

Figure 3:
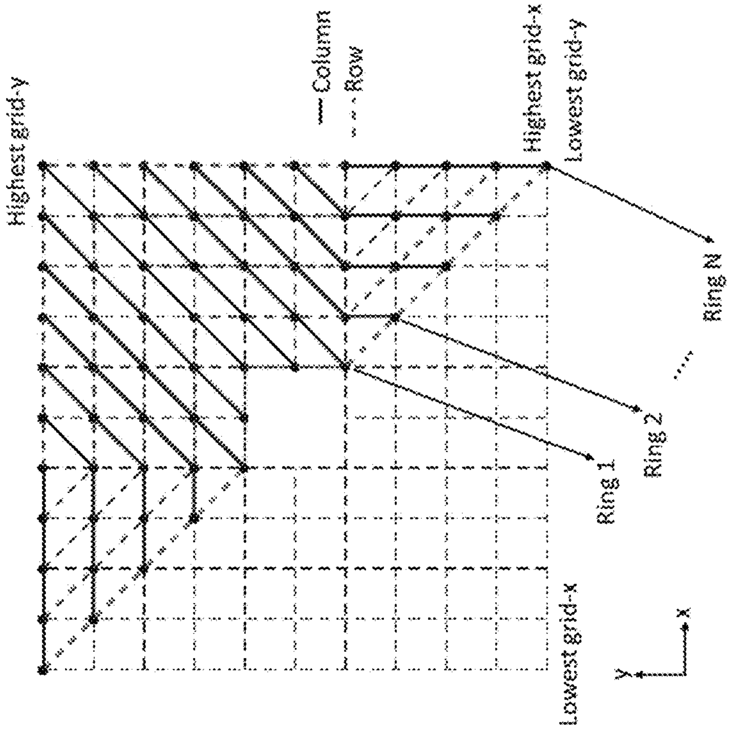
FIG. 3 illustrates an example of conversion from grid-based addressing to non-grid-based addressing.

In one embodiment, the grid-based addressing is converted to a non-grid-based addressing using a conversion process. FIG. 3 illustrates an example of a conversion from a grid-based addressing structure to a non-grid-based addressing structure. Referring to FIG. 3, the grid is represented with the Y and X axis with the lowest grid-x to the highest grid-x traversing the bottom axis from left to right and the lowest grid-y to the highest grid-y traversing the vertical axis from the bottom to the top of the grid. The columns are represented with solid lines coupling antenna elements, which are represented as dots, while the rows are represented with dash lines between the antenna elements on the grid. In one embodiment, each of the columns is coupled to the same number of antenna elements and each of the rows is coupled to the same number of antenna elements as shown in FIG. 3, but each of the rows and each of the columns are not coupled to the same number of antenna elements as each other. For example, in FIG. 3, each column is coupled to five antenna elements while each row is coupled to thirteen antenna elements.

Figure 4A:
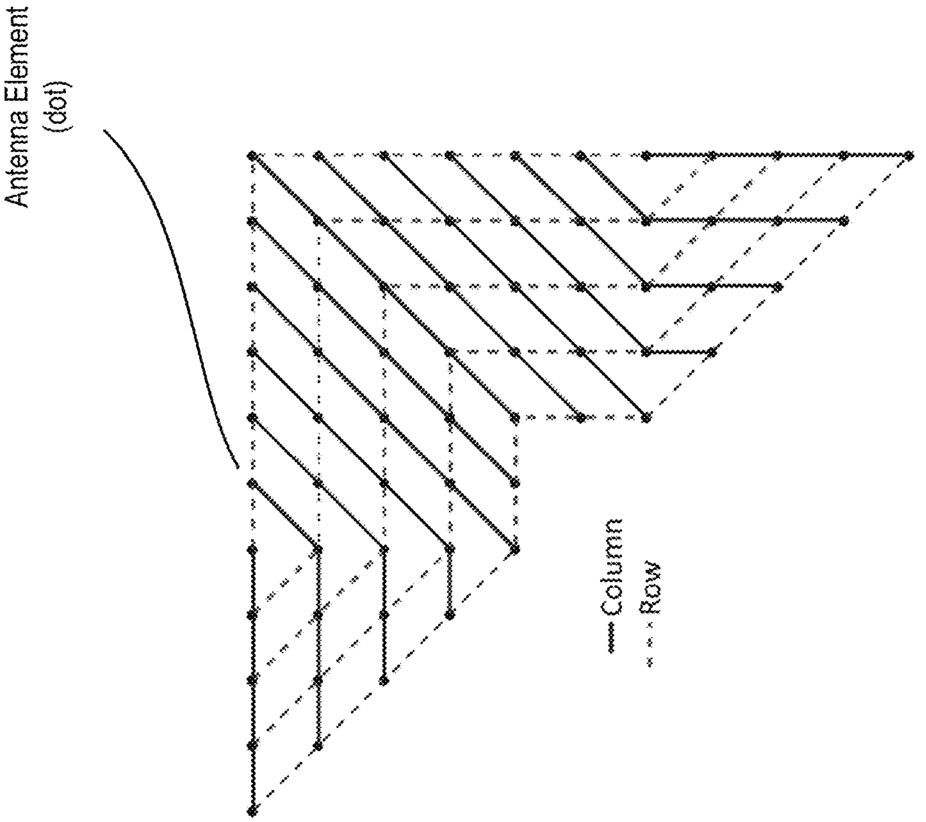
FIG. 4A illustrates a matrix with non-grid-based addressing.

FIG. 4A illustrates the matrix that results with the non-grid based addressing after conversion. Referring to FIG. 4A, each of the columns is represented by a solid line coupled to antenna elements (represented as dots) on the partial grid while each of the rows is represented as a dashed line coupled between antenna elements on the grid.

Figure 4B:
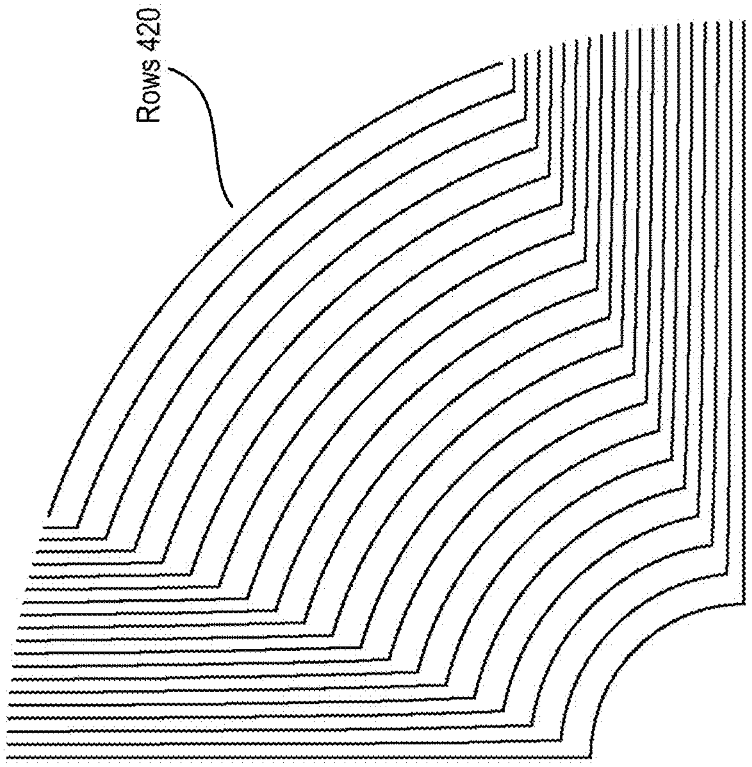
FIG. 4B provides the example of the row lines that are in one segment of antenna aperture.
Figure 4C:
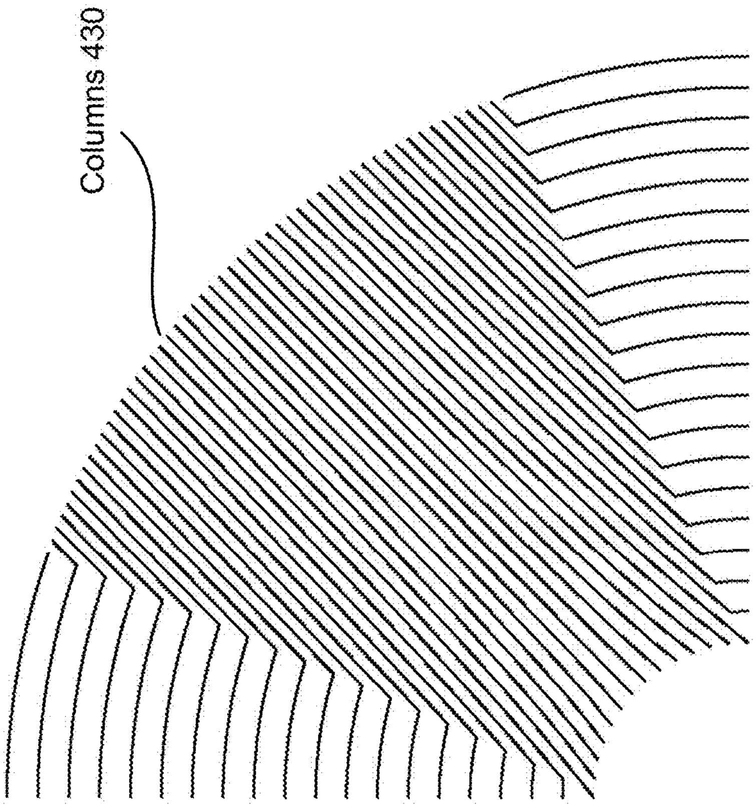
FIG. 4C illustrates an example of columns of a segment of an antenna aperture that use non-grid-based addressing.

While FIGS. 3 and 4A represent the matrix in a grid-based representation, in actuality the resulting rows and column when fabricated in the antenna aperture are not in the same configuration as depicted in FIGS. 3 and 4A. FIG. 4B provides the example of the row lines that are in one segment of antenna aperture. In one embodiment, the four segments are combined to form an aperture. For more information on segments that are used to form an aperture, see U.S. Pat. No. 9,887,455, entitled "Aperture Segmentation of a Cylindrical Feed Antenna". Referring to FIG. 4B, rows 420 are rows of the matrix drive circuitry that are coupled to antenna elements on the rings of antenna elements. FIG. 4C illustrates an example of columns of a segment of an antenna aperture that use non-grid-based addressing. Referring to FIG. 4C, columns 430 are columns of the matrix drive circuitry that are coupled to antenna moments on the rings of antenna elements in the aperture.

An Example Process for Creating

Figure 5A:
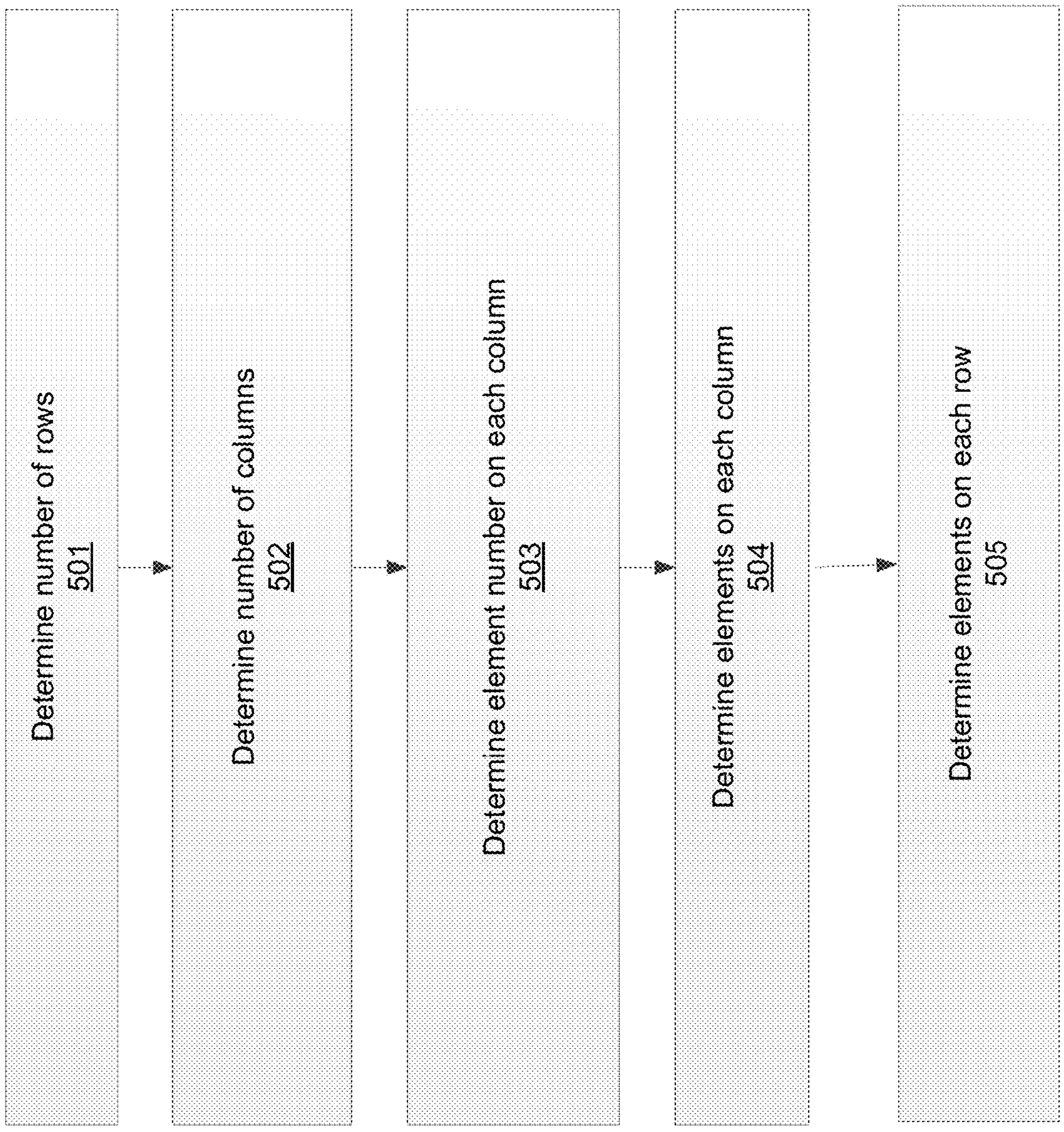
FIG. 5A is a flow diagram of one embodiment of a process for converting from a grid-based addressing scheme to a non-grid-based addressing scheme.

FIG. 5A is a flow diagram of one embodiment of a process for converting from a grid-based addressing scheme to a non-grid-based addressing scheme. In one embodiment, the processes are performed by processing logic that may comprise hardware (circuitry, dedicated logic, etc.), software (e.g., software running on a chip), firmware, or a combination of the three. In one embodiment, the process is performed by a manufacturing/fabrication system.

Referring to FIG. 5A, the process begins by processing logic determining a number of rows for the matrix (processing block 501). In one embodiment, processing logic determines the number of rows by setting the number of rows equal to the number of rings of antenna elements in the array of an antenna aperture.

Next, processing logic determines the number of columns in the matrix (processing block 502). In one embodiment, processing logic determines the number of columns in the matrix by setting the number of columns equal to (the number of elements in the inner most ring of the antenna aperture)+2*(the number of rows−1).

After determining the number of rows and number of columns in the matrix, processing logic determines the number of antenna elements to be coupled to each column (processing block 503). In one embodiment, processing logic determines the number of antenna elements coupled to each column line by setting it equal to the number of rings. That is, the number of rings in the array of the antenna aperture determines number of antenna elements coupled to a column line.

Using the number of antenna elements for each column line, processing logic determines which elements of the antenna array that will be on each column (processing block 504). This may be done in a number of ways.

Figure 5B:
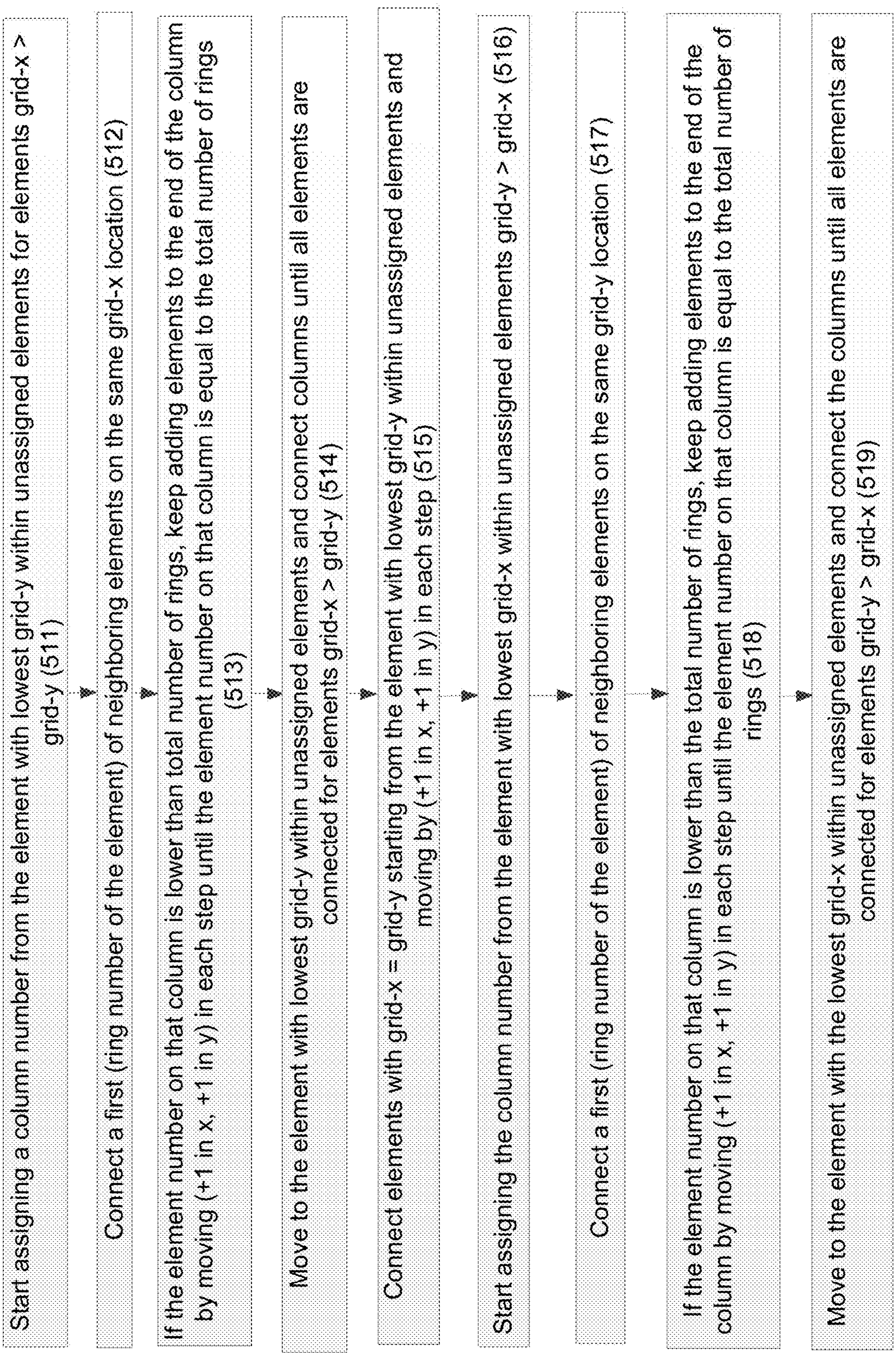
FIG. 5B is a flow diagram of one embodiment of a process for determining the antenna elements in the array of antenna elements that are for each column.

FIG. 5B is a flow diagram of one embodiment of a process for determining the antenna elements in the array of antenna elements that are for each column. In one embodiment, the processes are performed by processing logic that may comprise hardware (circuitry, dedicated logic, etc.), software (e.g., software running on a chip), firmware, or a combination of the three. In one embodiment, the process is performed by a manufacturing/fabrication system.

Referring to FIG. 5B, processing logic starts by assigning a column number for an antenna element with a lowest grid-y within the unassigned antenna elements for each of the antenna elements that are in grid-x greater than grid-y (processing block 511). Then processing logic connects a first ring number of the antenna element of neighboring antenna elements on the same grid-x location (processing block 512). The connected neighboring antenna elements are on the same column.

Next, processing logic determines if the element number on that column is lower than the total number of rings, and if so processing logic keeps adding antenna elements to the end of the column by moving in each step (+1 in the X direction, and +1 in the Y direction) until the antenna element number on that column is equal to the total number of rings (processing block 513). Once this had been completed, processing logic moves to the antenna element with the lowest grid-y location within the unassigned antenna elements and connects the columns until all the antenna elements are connected for antenna elements grid-x greater than grid-y (processing block 514). At this point, processing logic connects the antenna elements with grid-x equal to grid-y, starting from the antenna element with the lowest grid-y location within the unassigned elements and moving in each step (+1 in the X direction and +1 in the Y direction) (processing block 515). Note that these are on the same column.

Thereafter, processing logic starts assigning the column number from the antenna element with the lowest grid-x within the unassigned antenna elements grid-y greater than grid-x (processing block 516) and connects a first (ring number of antenna elements) of neighboring antenna elements on the same grid-y location (processing block 517). These connected neighboring antenna elements are on the same column. Once this has been completed, processing logic tests whether the antenna element number of that column is lower than the total number of rings, and if so, processing logic keeps adding antenna elements to the end the column by moving in each step (+1 in the X direction and +1 in the Y direction) until the antenna element number on that column is equal to the total number of rings (processing block 518). At this point, processing logic moves to the antenna element with the lowest grid-x within the unassigned antenna elements and connects the columns until all the antenna elements are connected for antenna elements grid-y greater than grid-x (processing block 519).

Referring back to FIG. 5A, after determining the elements on each column, processing logic determines the elements on each row (processing block 505). This may be done in a number of ways.

Figure 5C:
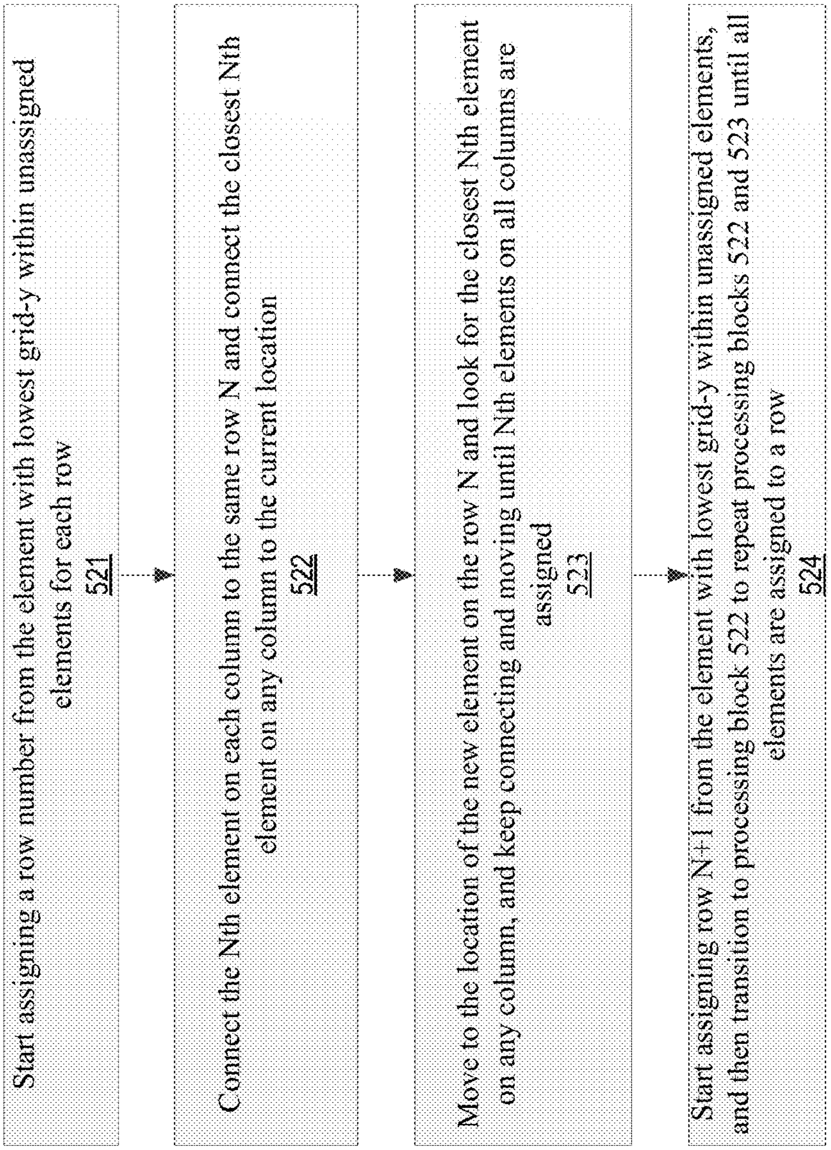
FIG. 5C is a flow diagram that illustrates one embodiment for determining the elements on each row.

FIG. 5C is a flow diagram that illustrates one embodiment for determining the elements on each row. In one embodiment, the processes are performed by processing logic that may comprise hardware (circuitry, dedicated logic, etc.), software (e.g., software running on a chip), firmware, or a combination of the three. In one embodiment, the process is performed by a manufacturing/fabrication system.

Referring to FIG. 5C, the process starts by processing logic assigning a row number from the antenna element with the lowest grid-y within the unassigned antenna elements for each row (processing block 521). Next, processing logic connects the Nth element of each column to the same row and connects the closest Nth element on any column to the current location (processing block 522). Then, processing logic moves to the location of the new element on the row and looks for the closest Nth antenna element on any column, and then keeps connecting and moving until the Nth antenna elements on all columns are assigned (processing block 523). Once this has been completed, processing logic starts assigning row N+1 from the antenna element with the lowest grid-y within the unassigned antenna elements (processing block 524) and transitions to processing block 522 to repeat processing blocks 522 and 523 until all antenna elements are assigned to a row.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology to form and steer transmit and receive beams through separate antennas.

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 6:
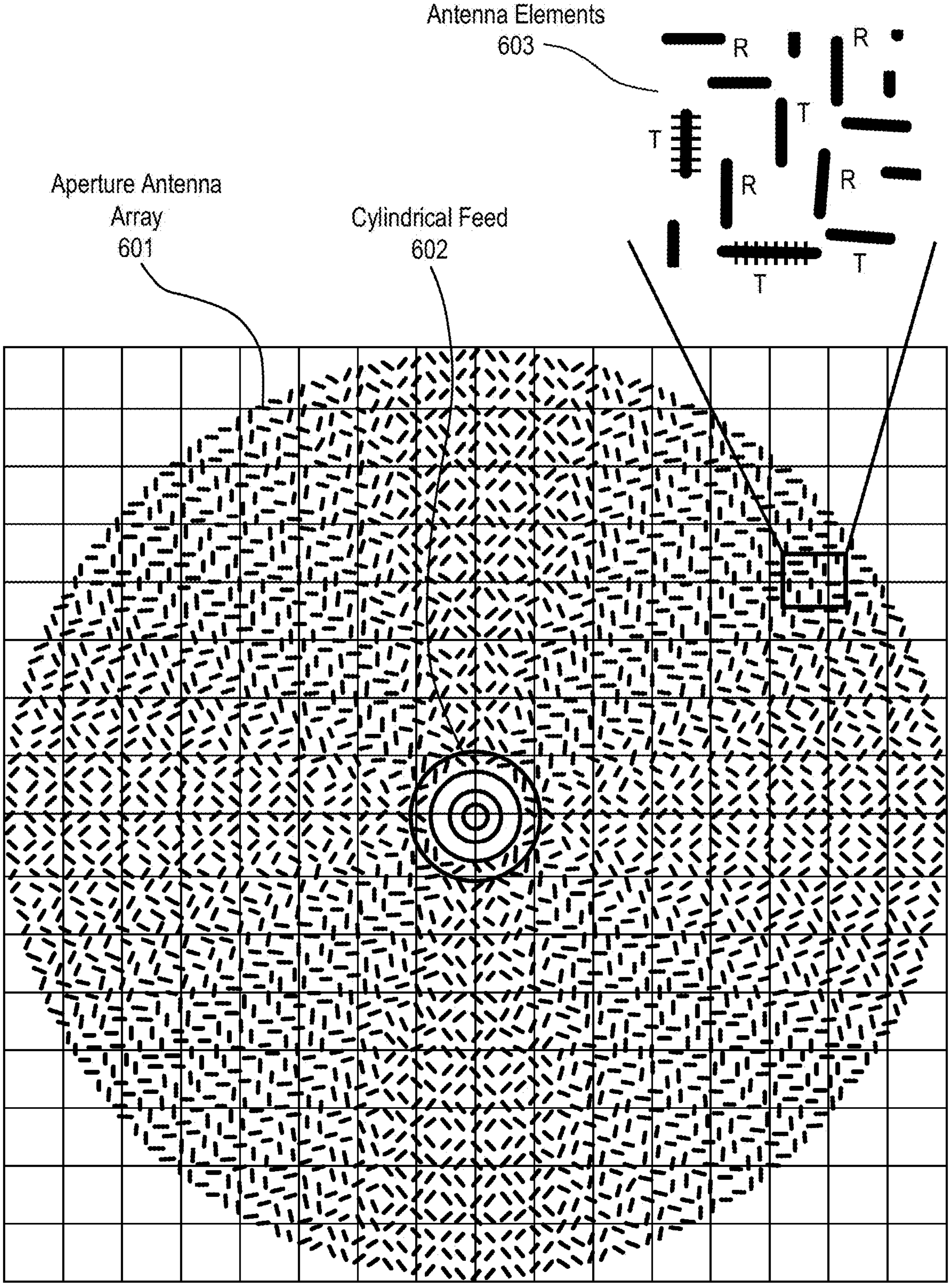
FIG. 6 illustrates an aperture having one or more arrays of antenna elements placed in concentric rings around an input feed of the cylindrically fed antenna.

FIG. 6 illustrates the schematic of one embodiment of a cylindrically fed holographic radial aperture antenna. Referring to FIG. 6, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 6 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 7:
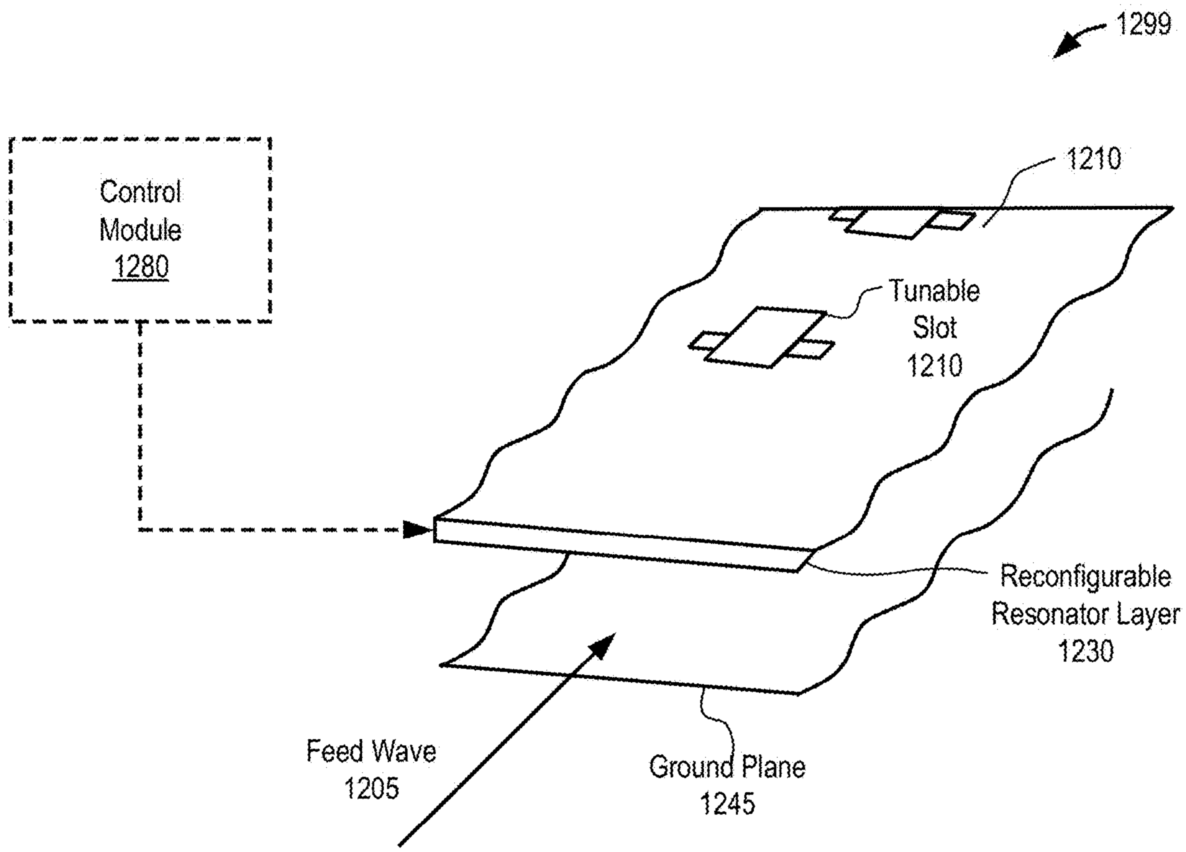
FIG. 7 illustrates a perspective view of one row of antenna elements that includes a ground plane and a reconfigurable resonator layer.

FIG. 7 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 8A:
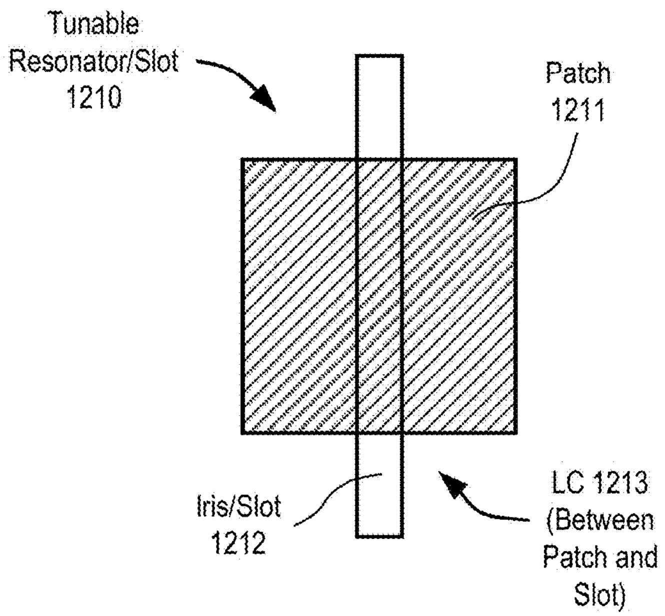
FIG. 8A illustrates one embodiment of a tunable resonator/slot.

Control module 1280 is coupled to reconfigurable resonator layer 1230 to modulate the array of tunable slots 1210 by varying the voltage across the liquid crystal in FIG. 8A. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w^*_{in}w_{out}$, with $w_{in}$ as the wave equation in the waveguide and $w_{out}$ the wave equation on the outgoing wave.

FIG. 8A illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 8B:
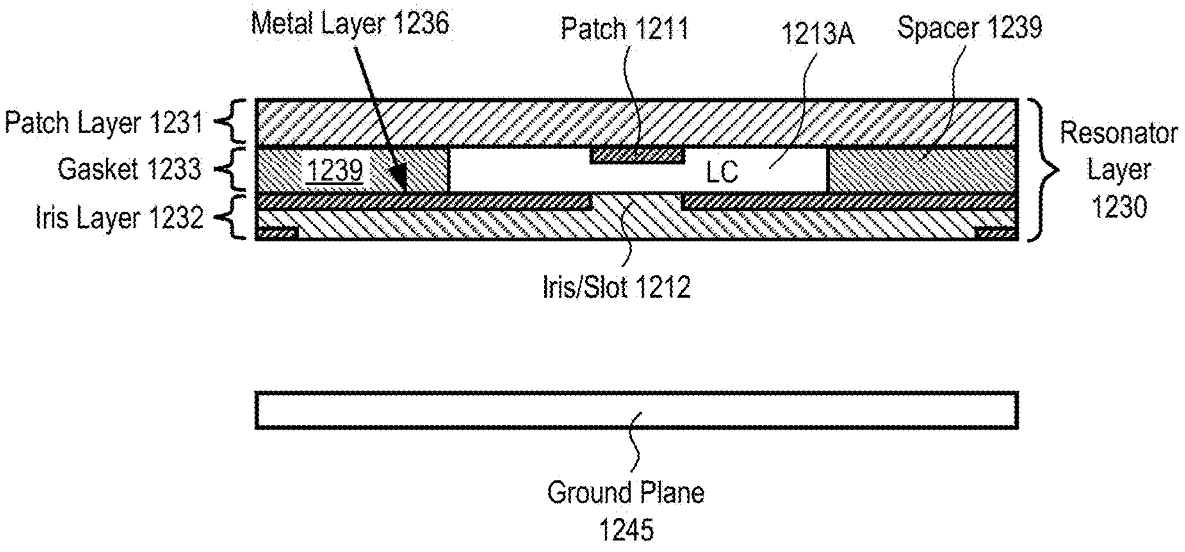
FIG. 8B illustrates a cross section view of one embodiment of a physical antenna aperture.

FIG. 8B illustrates a cross section view of one embodiment of a physical antenna aperture. The antenna aperture includes ground plane 1245, and a metal layer 1236 within iris layer 1232, which is included in reconfigurable resonator layer 1230. In one embodiment, the antenna aperture of FIG. 8B includes a plurality of tunable resonator/slots 1210 of FIG. 8A. Iris/slot 1212 is defined by openings in metal layer 1236. A feed wave, such as feed wave 1205 of FIG. 8A, may have a microwave frequency compatible with satellite communication channels. The feed wave propagates between ground plane 1245 and resonator layer 1230.

Reconfigurable resonator layer 1230 also includes gasket layer 1233 and patch layer 1231. Gasket layer 1233 is disposed between patch layer 1231 and iris layer 1232. Note that in one embodiment, a spacer could replace gasket layer 1233. In one embodiment, iris layer 1232 is a printed circuit board ("PCB") that includes a copper layer as metal layer 1236. In one embodiment, iris layer 1232 is glass. Iris layer 1232 may be other types of substrates.

Openings may be etched in the copper layer to form slots 1212. In one embodiment, iris layer 1232 is conductively coupled by a conductive bonding layer to another structure (e.g., a waveguide) in FIG. 8B. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1233 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 8B includes multiple tunable resonator/slots, such as tunable resonator/slot 1210 includes patch 1211, liquid crystal 1213, and iris 1212 of FIG. 8A. The chamber for liquid crystal 1213A is defined by spacers 1239, iris layer 1232 and metal layer 1236. When the chamber is filled with liquid crystal, patch layer 1231 can be laminated onto spacers 1239 to seal liquid crystal within resonator layer 1230.

A voltage between patch layer 1231 and iris layer 1232 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by λ/5. Other spacings may be used. In one embodiment, each tunable slot in a row is spaced from the closest tunable slot in an adjacent row by λ/2, and, thus, commonly oriented tunable slots in different rows are spaced by λ/4, though other spacings are possible (e.g., λ/5, λ/6.3). In another embodiment, each tunable slot in a row is spaced from the closest tunable slot in an adjacent row by λ/3.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 9A-D illustrate one embodiment of the different layers for creating the slotted array. The antenna array includes antenna elements that are positioned in rings, such as the example rings shown in FIG. 6. Note that in this example the antenna array has two different types of antenna elements that are used for two different types of frequency bands.

Figure 9A:
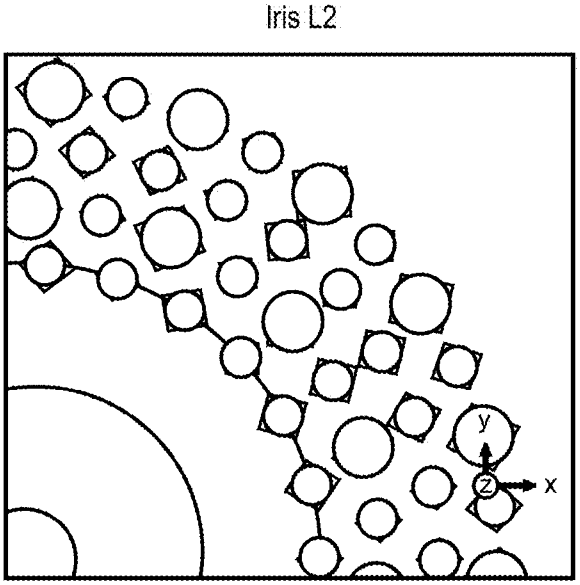
FIG. 9A illustrates a portion of the first iris board layer with locations corresponding to the slots.
Figure 9B:
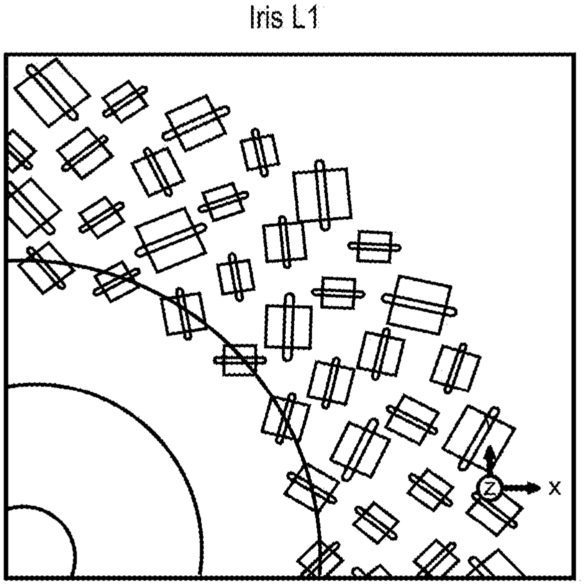
FIG. 9B illustrates a portion of the second iris board layer containing slots.
Figure 9C:
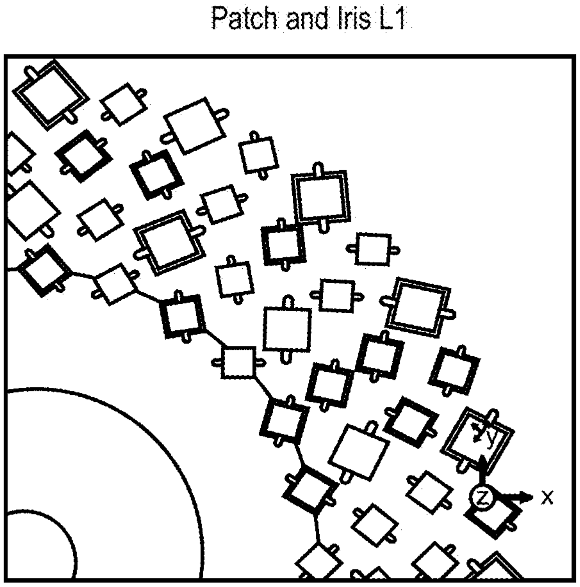
FIG. 9C illustrates patches over a portion of the second iris board layer.
Figure 9D:
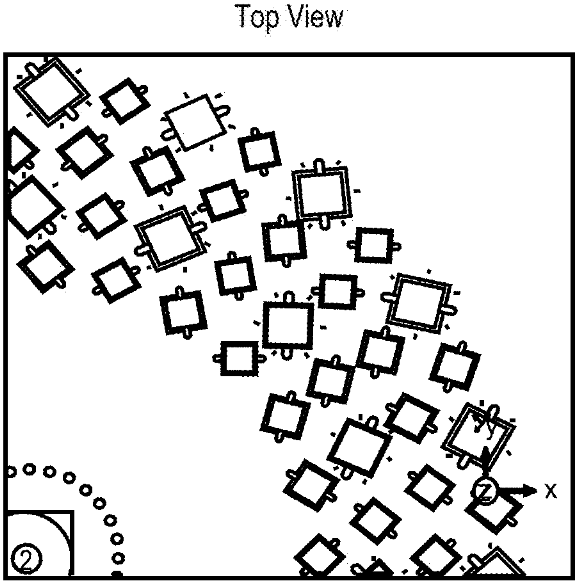
FIG. 9D illustrates a top view of a portion of the slotted array.

FIG. 9A illustrates a portion of the first iris board layer with locations corresponding to the slots. Referring to FIG. 9A, the circles are open areas/slots in the metallization in the bottom side of the iris substrate, and are for controlling the coupling of elements to the feed (the feed wave). Note that this layer is an optional layer and is not used in all designs. FIG. 9B illustrates a portion of the second iris board layer containing slots. FIG. 9C illustrates patches over a portion of the second iris board layer. FIG. 9D illustrates a top view of a portion of the slotted array.

Figure 10:
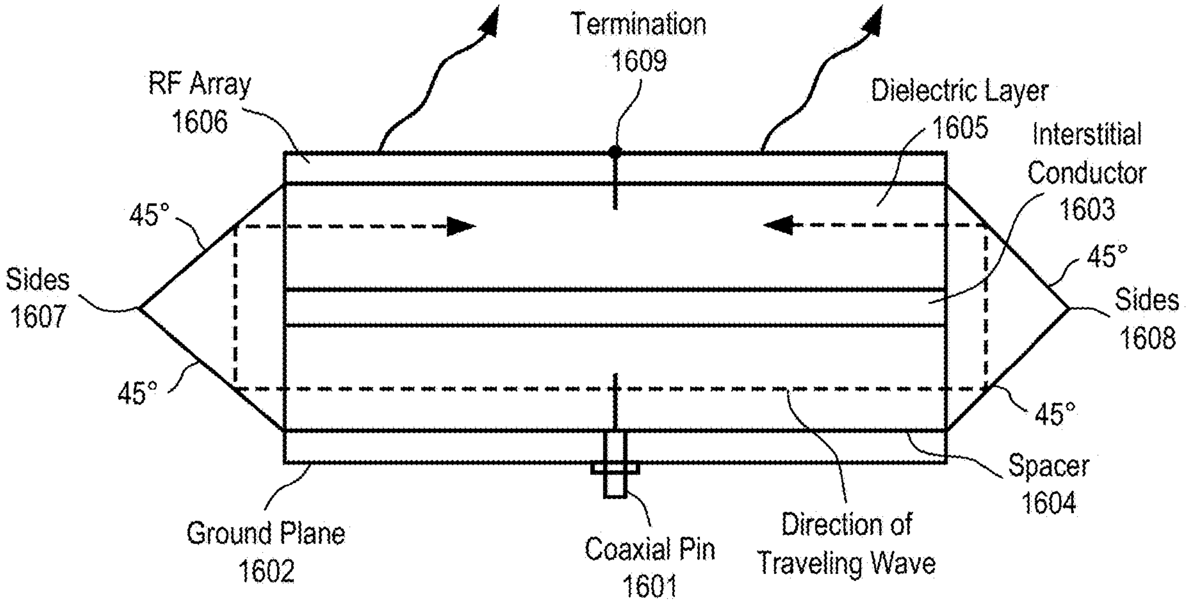
FIG. 10 illustrates a side view of one embodiment of a cylindrically fed antenna structure.

FIG. 10 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 10 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 10, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602.

Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 10 shows angled sides that have angle of 45 degrees, other angles that accomplish signal transmission from lower-level feed to upper-level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 11:
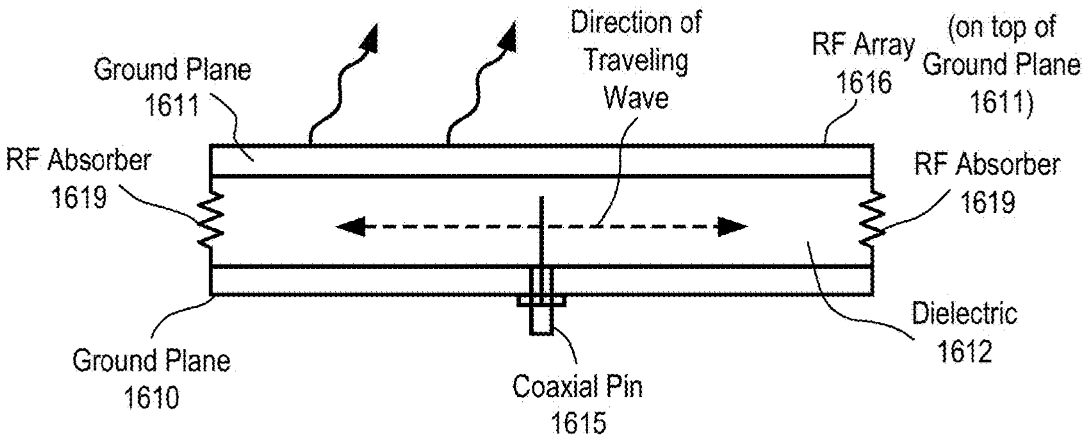
FIG. 11 illustrates another embodiment of the antenna system with an outgoing wave.

FIG. 11 illustrates another embodiment of the antenna system with an outgoing wave. Referring to FIG. 11, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 10 and 11 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 6 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 10 and RF array 1616 of FIG. 11 include a wave scattering subsystem that includes a group of patch antennas (i.e., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 12:
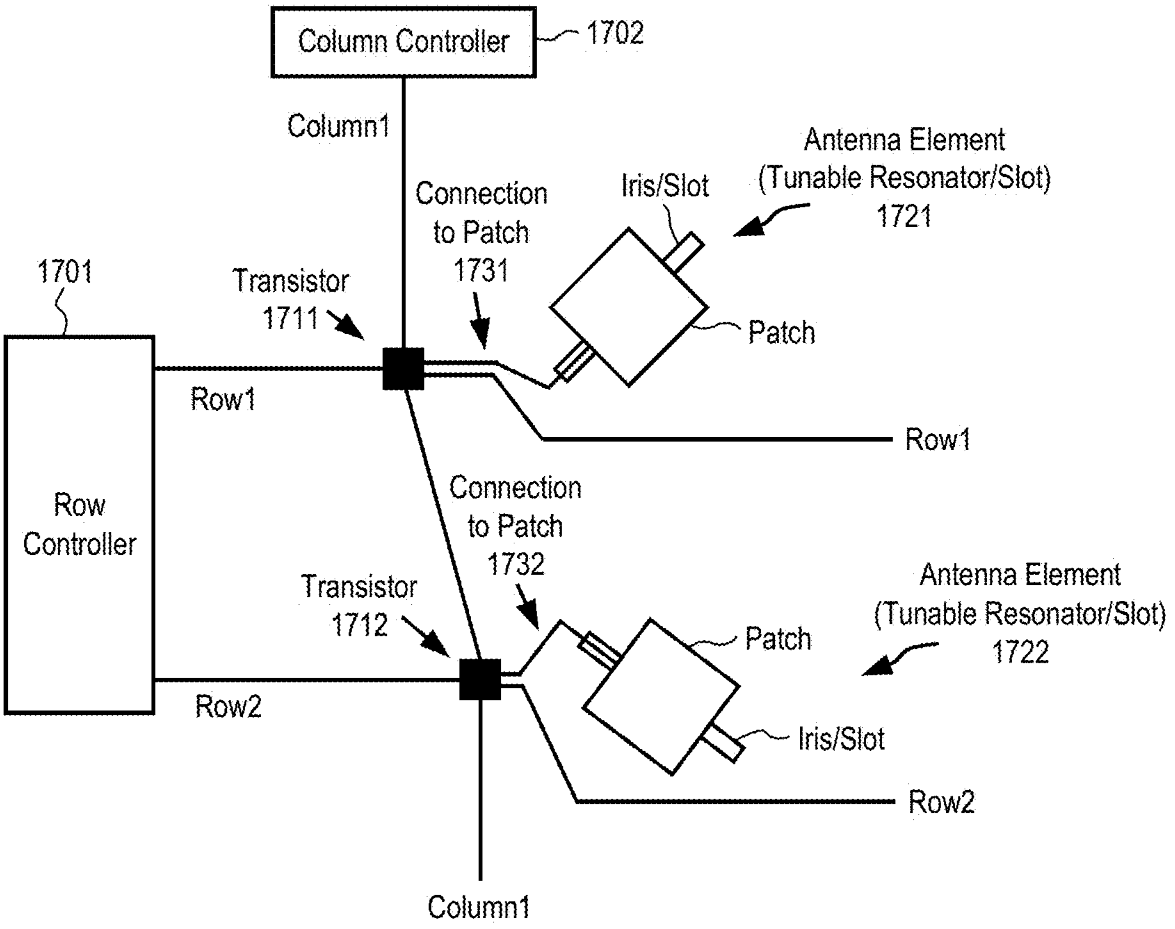
FIG. 12 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 12 illustrates one embodiment of the placement of matrix drive circuitry with respect to antenna elements. Referring to FIG. 12, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 13:
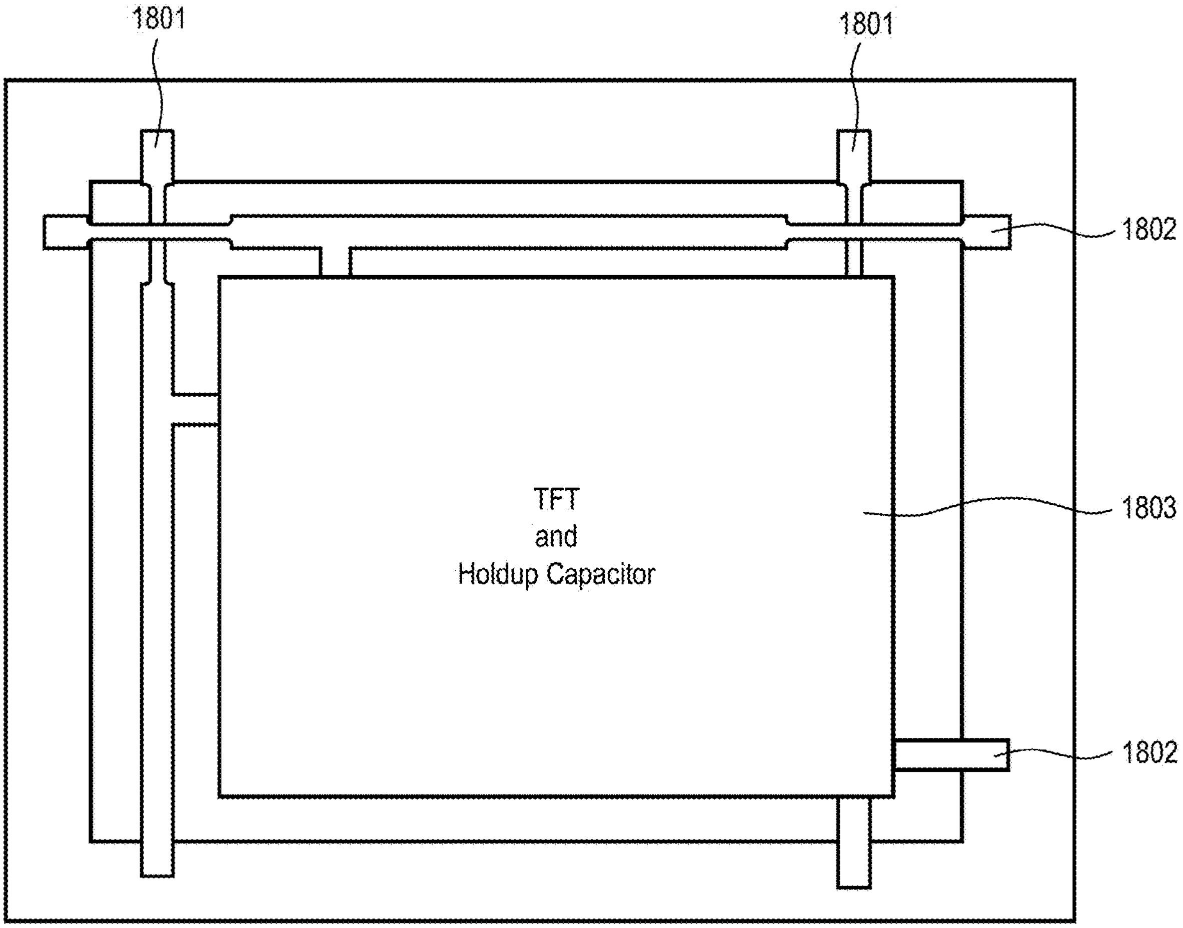
FIG. 13 illustrates one embodiment of a TFT package.

In one embodiment, a TFT package is used to enable placement and unique addressing in the matrix drive. FIG. 13 illustrates one embodiment of a TFT package. Referring to FIG. 13, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 14:
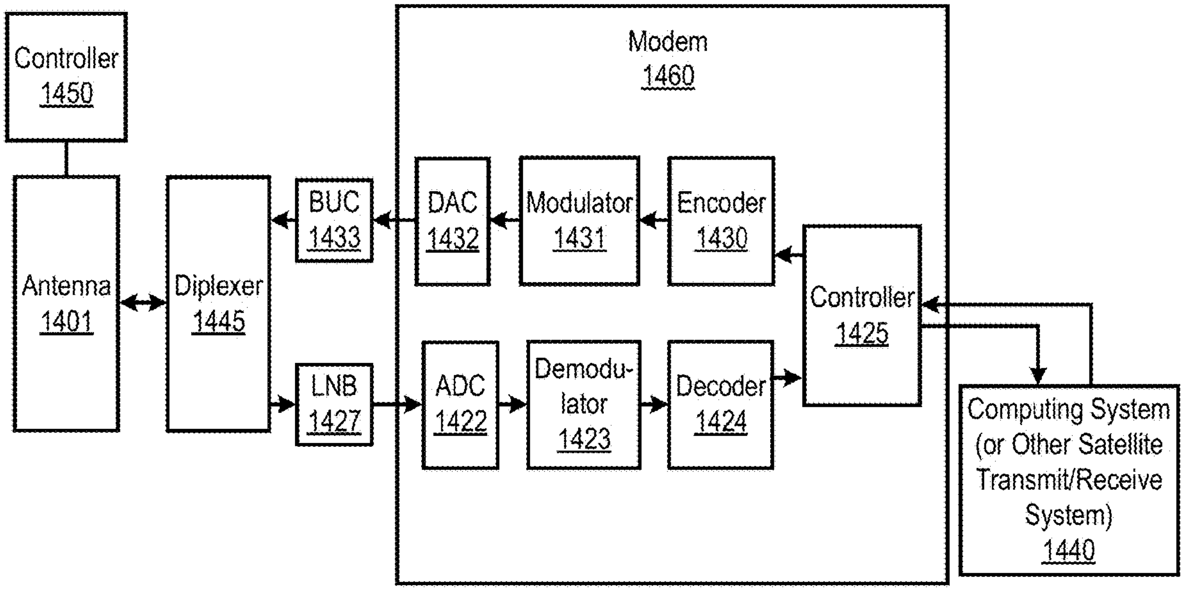
FIG. 14 is a block diagram of another embodiment of a communication system having simultaneous transmit and receive paths.

In another embodiment, the combined antenna apertures are used in a full duplex communication system. FIG. 14 is a block diagram of another embodiment of a communication system having simultaneous transmit and receive paths. While only one transmit path and one receive path are shown, the communication system may include more than one transmit path and/or more than one receive path.

Referring to FIG. 14, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNB) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (up-convert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 14 has a number of applications, including but not limited to, interne communication, vehicle communication (including software updating), etc.

There is a number of example embodiments described herein.

Example 1 is an antenna comprising: a plurality of radio-frequency (RF) radiating antenna elements located in a plurality of rings; and matrix drive circuitry coupled to the plurality of RF radiating antenna elements to drive the antenna elements, wherein the matrix drive circuitry to uniquely address each of the antenna elements using a matrix of a plurality of rows and a plurality of columns with a non-grid-based addressing structure.

Example 2 is the antenna of example 1 that may optionally include that at least a majority of the plurality of rows is coupled to a first number of antenna elements of the plurality of RF radiating antenna elements and at least a majority of the plurality of columns is coupled to a second number of antenna elements of the plurality of RF radiating antenna elements, where the first and second numbers are different.

Example 3 is the antenna of example 2 that may optionally include that the at least a majority of the plurality of rows comprises all rows of the plurality of rows and the at least a majority of the plurality of columns comprises all columns the plurality of columns.

Example 4 is the antenna of example 1 that may optionally include that the plurality of rings are equal in number to the plurality of rows.

Example 5 is the antenna of example 1 that may optionally include that the plurality of rows comprises a number of rings in the plurality of rings and the plurality of columns comprises a sum of the number of elements in the inner most ring of the plurality of rings and a product of two times a result of subtracting one from the number of rings.

Example 6 is the antenna of example 1 that may optionally include that each row of the plurality of rows is longer than each column in the plurality of columns.

Example 7 is the antenna of example 1 that may optionally include that the plurality of RF radiating elements comprise metamaterial RF radiating antenna elements.

Example 8 is an comprising: an antenna aperture having a plurality of radio-frequency (RF) radiating antenna elements located in a plurality of rings; and matrix drive circuitry coupled to the plurality of RF radiating antenna elements to drive the antenna elements, wherein the matrix drive circuitry to uniquely address each of the antenna elements using a matrix of a plurality of rows and a plurality of columns, and further wherein at least a majority of the plurality of rows is coupled to a first number of antenna elements of the plurality of RF radiating antenna elements and at least a majority of the plurality of columns is coupled to a second number of antenna elements of the plurality of RF radiating antenna elements, where the first and second numbers are different.

Example 9 is the antenna of example 8 that may optionally include that the at least a majority of the plurality of rows comprises all rows of the plurality of rows and the at least a majority of the plurality of columns comprises all columns of the plurality of columns.

Example 10 is the antenna of example 9 that may optionally include that the plurality of rings are equal in number to the plurality of rows.

Example 11 is the antenna of example 8 that may optionally include that the plurality of rows comprises a number of rings in the plurality of rings and the plurality of columns comprises a sum of the number of elements in the inner most ring of the plurality of rings and a product of two times a result of subtracting one from the number of rings.

Example 12 is the antenna of example 9 that may optionally include that each row of the plurality of rows is longer than each column in the plurality of columns.

Example 13 is the antenna of example 9 that may optionally include that the plurality of RF radiating elements comprise metamaterial RF radiating antenna elements.

Example 14 is a method for laying out matrix drive circuitry for use in an antenna having a plurality of radio-frequency (RF) radiating antenna elements located in a plurality of rings, where the matrix drive circuitry to uniquely address each of the antenna elements using a matrix of a plurality of rows and a plurality of columns. The method comprises: determining a number of rows in the plurality of rows and a number of columns in the plurality of columns; determining a number of antenna elements of the plurality of antenna elements to be coupled to each column in the plurality of columns; determining antenna elements of the plurality of antenna elements to be coupled to each column in the plurality of columns; and determining antenna elements of the plurality of antenna elements to be coupled to each row in the plurality of rows.

Example 15 is the method of example 14 that may optionally include that determining the number of rows and the number of columns comprises setting the number of rows equal to a number of rings of RF radiating antenna elements and setting the number of columns equal to a number of antenna elements in an innermost ring of the plurality of rings plus two times a result of subtracting one from the number of rows.

Example 16 is the method of example 14 that may optionally include that determining the element number for each column in the plurality of columns comprises setting the element number equal to a total number of rings in the plurality of rings.

Example 17 is the method of example 14 that may optionally include that determining antenna elements of the plurality of antenna elements to be coupled to each column in the plurality of columns comprises assigning columns along grid lines and/or diagonally to have same number of elements on all columns.

Example 18 is the method of example 14 that may optionally include that determining antenna elements of the plurality of antenna elements to be coupled to each row in the plurality of rows comprises assigning rows along grid lines and/or diagonally to have a same number of elements on all rows.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An antenna comprising:

an antenna aperture having a plurality of radio-frequency (RF) radiating antenna elements located in a plurality of rings; and matrix drive circuitry coupled to the plurality of RF radiating antenna elements to drive the antenna elements, wherein the matrix drive circuitry to uniquely address each of the antenna elements using a matrix of a plurality of rows and a plurality of columns, and further wherein the plurality of rows is coupled to a first number of antenna elements of the plurality of RF radiating antenna elements and the plurality of columns is coupled to a second number of antenna elements of the plurality of RF radiating antenna elements, where the first and second numbers are different, wherein rings in the plurality of rings are equal in number to a number of rows in the plurality of rows, and wherein the plurality of columns is equal in number to a sum of:

a product of two times the number of rows and three.

2. The antenna of claim 1 wherein each row of the plurality of rows is longer than each column in the plurality of columns.

3. The antenna of claim 1 wherein the plurality of RF radiating elements comprise metamaterial RF radiating antenna elements.

4. An antenna comprising:

an antenna aperture having a plurality of radio-frequency (RF) radiating antenna elements located in a plurality of rings; and matrix drive circuitry coupled to the plurality of RF radiating antenna elements to drive the antenna elements, wherein the matrix drive circuitry to uniquely address each of the antenna elements using a matrix of a plurality of rows and a plurality of columns, and further wherein the plurality of rows is coupled to a first number of antenna elements of the plurality of RF radiating antenna elements and the plurality of columns is coupled to a second number of antenna elements of the plurality of RF radiating antenna elements, where the first and second numbers are different, wherein the plurality of rows comprises a number of rings in the plurality of rings and the plurality of columns comprises a sum of the number of elements in the inner most ring of the plurality of rings and a product of two times a result of subtracting one from the number of rings.

5. A method for laying out matrix drive circuitry for use in an antenna having a plurality of radio-frequency (RF) radiating antenna elements located in a plurality of rings, the matrix drive circuitry to uniquely address each of the antenna elements using a matrix of a plurality of rows and a plurality of columns, the method comprising:

determining a number of rows in the plurality of rows and a number of columns in the plurality of columns, and wherein the number of rows is equal in number to a number of rings in the plurality of rings, and wherein the number of columns is equal in number to a sum of: a product of two times the number of rows and three;

determining a number of antenna elements of the plurality of antenna elements to be coupled to each column in the plurality of columns;

determining antenna elements of the plurality of antenna elements to be coupled to each column in the plurality of columns; and determining antenna elements of the plurality of antenna elements to be coupled to each row in the plurality of rows.

6. The method of claim 5 wherein determining the element number for each column in the plurality of columns comprises setting the element number equal to a total number of rings in the plurality of rings.

7. The method of claim 5 wherein determining antenna elements of the plurality of antenna elements to be coupled to each column in the plurality of columns comprises assigning columns along grid lines and/or diagonally to have same number of elements on all columns.

8. The method of claim 5 wherein determining antenna elements of the plurality of antenna elements to be coupled to each row in the plurality of rows comprises assigning rows along grid lines and/or diagonally to have a same number of elements on all rows.

9. The method of claim 5 wherein the plurality of columns and plurality of rows are addressed with a non-grid addressing structure, and wherein determining antenna elements of the plurality of antenna elements to be coupled to each column in the plurality of columns and determining antenna elements of the plurality of antenna elements to be coupled to each row in the plurality of rows are performed based on an grid locations in an x-y grid.

10. The method of claim 9 wherein determining the antenna elements of the plurality of antenna elements to be coupled to each row in the plurality of rows comprises:

(a) assigning a row number from the antenna element with the lowest grid-y within the unassigned antenna elements for each row;

(b) connecting the Nth element of each column to the same row;

(c) connecting a closest Nth element on any column to a current location;

(d) moving a location of the new element on the row and determining a closest Nth antenna element on any column;

(e) connecting and moving until the Nth antenna elements on all columns are assigned; and (f) assigning row N+1 from the antenna element with the lowest grid-y within the unassigned antenna elements and repeat (b)-(e) until all antenna elements are assigned to a row.

* * * * *